United States Patent
Yamada et al.

(10) Patent No.: US 9,518,494 B2
(45) Date of Patent: Dec. 13, 2016

(54) HONEYCOMB STRUCTURE

(71) Applicant: NGK Insulators, Ltd., Nagoya (JP)

(72) Inventors: Toshio Yamada, Nagoya (JP); Hidetoshi Yanase, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 339 days.

(21) Appl. No.: 14/215,543

(22) Filed: Mar. 17, 2014

(65) Prior Publication Data

US 2014/0287190 A1    Sep. 25, 2014

(30) Foreign Application Priority Data

Mar. 22, 2013 (JP) .................................. 2013-060614

(51) Int. Cl.

| | |
|---|---|
| *B01D 46/24* | (2006.01) |
| *F01N 3/28* | (2006.01) |
| *B32B 3/12* | (2006.01) |
| *C04B 38/00* | (2006.01) |
| *F01N 3/022* | (2006.01) |
| *C04B 111/00* | (2006.01) |

(52) U.S. Cl.
CPC ........... *F01N 3/2828* (2013.01); *B01D 46/247* (2013.01); *B01D 46/2455* (2013.01); *B32B 3/12* (2013.01); *C04B 38/0016* (2013.01); *B01D 46/2459* (2013.01); *B01D 2046/2496* (2013.01); *C04B 2111/00793* (2013.01); *F01N 3/0222* (2013.01); *F01N 2330/30* (2013.01); *Y10T 428/24149* (2015.01); *Y10T 428/24157* (2015.01)

(58) Field of Classification Search
None
See application file for complete search history.

(56) References Cited

U.S. PATENT DOCUMENTS 5,961,931 A    10/1999    Ban et al.
6,299,958 B1 *  10/2001    St. Julien ............ C04B 38/0009
                                               428/116

(Continued)

FOREIGN PATENT DOCUMENTS

| DE | 695 14 608 T2 | 9/2000 | |
|---|---|---|---|
| DE | WO 03092857 A2 * | 11/2003 | ........... F01N 3/0222 |

(Continued)

OTHER PUBLICATIONS

German Examination Report (With English Translation), dated Oct. 24, 2014 (11 pages).

*Primary Examiner* — David Sample
*Assistant Examiner* — Nicholas W Jordan
(74) *Attorney, Agent, or Firm* — Burr & Brown, PLLC

(57) ABSTRACT

A honeycomb structure constituted by honeycomb segments, where a honeycomb segment has a first end and second end surfaces of a quadrangular shape; the second end surface having an area larger than that of the first one, a first pair of two side surfaces facing each other in parallel, and a second pair of two side surfaces facing each other make side surfaces become gradually narrow from the second end surface toward the first end surface, where a plurality of honeycomb segments are disposed in such a manner that the honeycomb segments are aligned to form rows in parallel in a predetermined direction, so as to make adjacent honeycomb segments directed opposite to each other in first end surfaces bonded to each other with one of side surfaces of the second pair of side surfaces.

16 Claims, 7 Drawing Sheets

(56) References Cited

U.S. PATENT DOCUMENTS

| | | | |
|---|---|---|---|
| 6,596,666 B1 | 7/2003 | Yamada | |
| 6,884,626 B1 * | 4/2005 | Borrelli | B01J 19/0046 422/507 |
| 7,247,184 B2 | 7/2007 | Frost | |
| 7,879,427 B2 * | 2/2011 | Ohno | F01N 3/2828 428/116 |
| 7,976,769 B2 * | 7/2011 | Fletcher | C04B 41/009 264/630 |
| 2002/0076523 A1 | 6/2002 | Ketcham et al. | |
| 2005/0076627 A1 | 4/2005 | Itou et al. | |
| 2008/0176029 A1 * | 7/2008 | Ichikawa | B01D 46/2455 428/116 |
| 2009/0140471 A1 * | 6/2009 | Fletcher | C04B 41/009 264/630 |
| 2009/0246455 A1 | 10/2009 | Mizutani | |
| 2009/0286042 A1 * | 11/2009 | Yamashita | B01D 46/247 428/116 |
| 2014/0093436 A1 * | 4/2014 | Nishio | B01D 46/2466 422/171 |

FOREIGN PATENT DOCUMENTS

| | | | |
|---|---|---|---|
| DE | 601 08 347 T2 | 3/2006 | |
| EP | 0 707 139 A1 | 4/1996 | |
| EP | 1 217 185 A2 | 6/2002 | |
| FR | 2789327 A1 * | 8/2000 | B01D 46/2407 |
| JP | 2001-138416 A1 | 5/2001 | |
| WO | WO 9932277 A1 * | 7/1999 | C04B 38/0009 |
| WO | 2008/096502 A1 | 8/2008 | |
| WO | WO 2008120499 A1 * | 10/2008 | B01D 46/247 |

\* cited by examiner

HONEYCOMB STRUCTURE

The present application is an application based on JP-2013-060614 filed on Mar. 22, 2013 with the Japanese Patent Office, the entire contents of which are incorporated herein by reference.

BACKGROUND OF THE INVENTION

Field of the Invention

The present invention relates to a honeycomb structure for use in a filter or the like to collect particulate matters included in an exhaust gas of a diesel engine or a gasoline engine.

2. Description of Related Art

In an exhaust gas of a diesel engine or a gasoline engine such as a gasoline direct injection (GDI) engine, a particulate matter (PM) is included. This PM is mainly composed of carbon fine particles such as soot, and it is recognized to be a carcinogen, so that it is necessary to prevent the PM from being discharged to the atmosphere, and hence strict emission regulations have been imposed thereon.

To cope with such strict emission regulations, a large number of investigations have been performed to decrease an amount of the PM emission, but there is a limit to the decrease of the amount of the PM emission by improvement of a burning technology, and at present, the disposing of a filter in an exhaust system is only one effective means for decreasing the amount of the PM emission.

As the filter for collecting the PM, a wall flow type filter using a honeycomb structure has broadly been used because a high PM collecting efficiency can be obtained while suppressing a pressure loss to an allowable range. The honeycomb structure for use in the wall flow type filter has porous partition walls to define and form a plurality of cells extending from an inlet end surface on an inlet side of the exhaust gas to an outlet end surface on an outlet side of the exhaust gas. In this honeycomb structure, plugging portions are disposed to plug open end portions on an outlet end surface side of predetermined cells and open end portions on an inlet end surface side of the remaining cells, whereby the filter having a high PM collecting efficiency can be obtained.

That is, in the honeycomb structure in which the plugging portions are disposed in this way, the exhaust gas which has flowed into the cells from the inlet end surface passes the partition walls, and then flows out of the cells from the outlet end surface. When the exhaust gas passes the partition walls, the partition walls function as filter layers, so that the PM included in the exhaust gas is collected.

Additionally, to continuously use such a filter for a long period of time, the filter needs to be periodically subjected to a regeneration treatment. That is, for the purpose of decreasing the pressure loss increased due to the PM deposited in the filter with an elapse of time to return a filter performance to an initial state, the PM deposited in the filter needs to be burned by a high-temperature gas and removed. Furthermore, during this regeneration, high heat stress is generated in the filter due to the burning heat of the PM, and hence the filter is damaged sometimes.

Heretofore, as a measure for preventing such damage on the filter, it has been suggested that the whole filter is not manufactured as one honeycomb structure, but a plurality of segments having a honeycomb form (honeycomb segments) are bonded to obtain the honeycomb structure for the filter. Specifically, the plurality of honeycomb segments are integrally bonded to one another by a bonding material which has a low elastic modulus and is easily deformed to obtain a segment structure, whereby the heat stress applied to the honeycomb structure during the regeneration is scattered and alleviated to intend enhancement of heat shock resisting properties.

When the honeycomb structure of such a segment structure is used, the filter having high thermal shock resistance can be obtained, but on the other hand, a new problem inherent in the honeycomb structure of the segment structure occurs. That is, in the filter in which the honeycomb structure of the segment structure is used, there is the problem that movement (shift) easily occurs in the honeycomb segments constituting the honeycomb structure due to vibration or a pressure of the exhaust gas (hereinafter referred to as an exhaust pressure) during the use of the filter.

As one of means for solving this problem, in Patent Document 1, it has been suggested that a flatness of an outer wall as a binding surface of honeycomb segments is set to a specific value, thereby enhancing a bonding strength between the honeycomb segments. Furthermore, in Patent Document 2, it has been suggested that a honeycomb segment in which an area of an inlet side end surface is smaller than an area of an outlet side end surface is used, and a bonding width of a bonding material of the inlet side end surface is larger than a bonding width of the bonding material of the outlet side end surface, thereby heightening a structural strength.

[Patent Document 1] JP-A-2001-138416
[Patent Document 2] WO 2008/096502

SUMMARY OF THE INVENTION

However, there is a limit to enhancement of a bonding force between honeycomb segments by means suggested in Patent Documents 1 and 2, and it has been difficult to obtain a honeycomb structure having a strong structure capable of sufficiently suppressing the movement (shift) of the honeycomb segments due to vibration or exhaust pressure. Furthermore, in the means proposed by Patent Document 2, a thickness (a bonding width) of a bonding material needs to be changed between an inlet side end surface and an outlet side end surface, which has caused the problem that assembling is difficult.

The present invention has been developed in view of such a situation, and an object thereof is to provide a honeycomb structure of a segment structure which is easily assembled (manufactured) and is capable of effectively suppressing the movement (shift) of honeycomb segments due to vibration or exhaust pressure during use.

To achieve the above object, according to the present invention, there is provided a honeycomb structure in the following.

According to a first aspect of the present invention, a honeycomb structure in which a plurality of honeycomb segments are integrally bonded via a bonding material is provided, each of the honeycomb segments having a first end surface, a second end surface, porous partition walls to define and form a plurality of cells extending from the first end surface to the second end surface, and an outer peripheral surface connecting the first end surface to the second end surface, wherein as to each of the honeycomb segments other than the honeycomb segments positioned in the outermost periphery of the honeycomb structure among the plurality of honeycomb segments, the first end surface has a quadrangular shape, the second end surface has a quadrangular shape having an area larger than that of the first end surface, the outer peripheral surface includes four side surfaces, the four side surfaces are constituted of a pair of parallel side surfaces including two side surfaces facing each other in parallel and a pair of tapered side surfaces including two side surfaces facing each other so that a space between the surfaces narrows from the side of the second end surface toward the side of the first end surface, and when the first end surface is seen from a vertical direction thereto, both of X and Z are from 0.3 to 7 mm, where X is a distance between a side constituting the shape of the first end surface and coining in contact with one side surface in the pair of tapered side surfaces and a side constituting the shape of the second end surface and coming in contact with one side surface in the pair of tapered side surfaces, and Z is a distance between a side constituting the shape of the first end surface and coming in contact with the other side surface in the pair of tapered side surfaces and a side constituting the shape of the second end surface and coming in contact with the other side surface in the pair of tapered side surfaces, S1/S2 is 0.8 or more, where S1 is the area of the first end surface and S2 is the area of the second end surface, the plurality of honeycomb segments are disposed to constitute a plurality of parallel rows extending in a predetermined direction on an end surface of the honeycomb structure, and the honeycomb segments constituting the respective rows have a relation between the adjacent honeycomb segments in which the first end surfaces of the respective honeycomb segments are directed opposite to each other, and the side surfaces on one side of the pair of tapered side surfaces face each other.

According to a second aspect of the present invention, the honeycomb structure according to the above first aspect is provided, wherein the X and the Z have the same value.

According to a third aspect of the present invention, the honeycomb structure according to the above first aspect is provided, wherein the X and the Z have different values.

According to a fourth aspect of the present invention, the honeycomb structure according to any one of the above first to third aspects is provided, wherein the honeycomb segments having been aligned with first end surfaces in the same direction each other and included in the adjacent rows are slightly dislocated, each other in an extending direction of the rows.

According to a fifth aspect of the present invention, the honeycomb structure according to any one of the above first to fourth aspects is provided, wherein each corner portion of a cross section vertical to a length direction of the honeycomb segment is formed into a round shape having a radius of 0.1 to 5 mm.

According to a sixth aspect of the present invention, the honeycomb structure according to any one of the above to first to fifth aspects is provided, wherein the honeycomb segment has plugging portions to plug alternately open end portions on the first end surface side of predetermined cells and open end portions on the second end surface side of the remaining cells.

According to a seventh aspect of the present invention, the honeycomb structure according to any one of the above first to sixth aspects is provided, wherein the honeycomb structure constructed by bonding a plural number of the honeycomb segments integrally via the bonding layer has an outer periphery coating layer formed on a processed surface by grinding processing.

The honeycomb structure of the present invention is constituted so that a shape and arrangement of honeycomb segments satisfy specific conditions, whereby the honeycomb structure has a strong structure. Therefore, even when this honeycomb structure is used in a filter to be disposed in an exhaust system, the movement (shift) of the honeycomb segments due to vibration or exhaust pressure during the use of the filter does not easily occur. Furthermore, the axial directions in some cells in the segments are not parallel, but gradually incline toward the other end surfaces with respect to the axial direction of the honeycomb structure. Therefore, since an exhaust gas flowing along the axial direction of the honeycomb structure easily comes in contact with partition walls to define and form the cells of the segments, a PM collecting efficiency of the honeycomb structure increases. Furthermore, since some portion of the cells of the honeycomb segments positioned in the outermost periphery of the honeycomb structure are tapered in their axes with respect to the axial direction of the honeycomb structure, the cells having a large degree of the inclination are formed as dead channels into which the exhaust gas hardly flows, by outer periphery grind processing. Therefore, a warmth retaining effect is produced, and a heating efficiency during regeneration of the filter enhances. Furthermore, the honeycomb structure of the present invention, during the manufacturing thereof, does not require any step that makes it difficult to assemble the honeycomb structure, for example, a step of changing a thickness of a bonding material between one end surface and the other end surface of the honeycomb structure, and hence the honeycomb structure can comparatively easily be manufactured.

DESCRIPTION OF THE PREFERRED EMBODIMENTS

Hereinafter, embodiments of the present invention will specifically be described. However, the present invention is not limited to the embodiments when interpreted, and various changes, modifications and improvements can be added on the basis of ordinary knowledge of a person skilled in the art without departing from the scope of the present invention.

Figure 1:
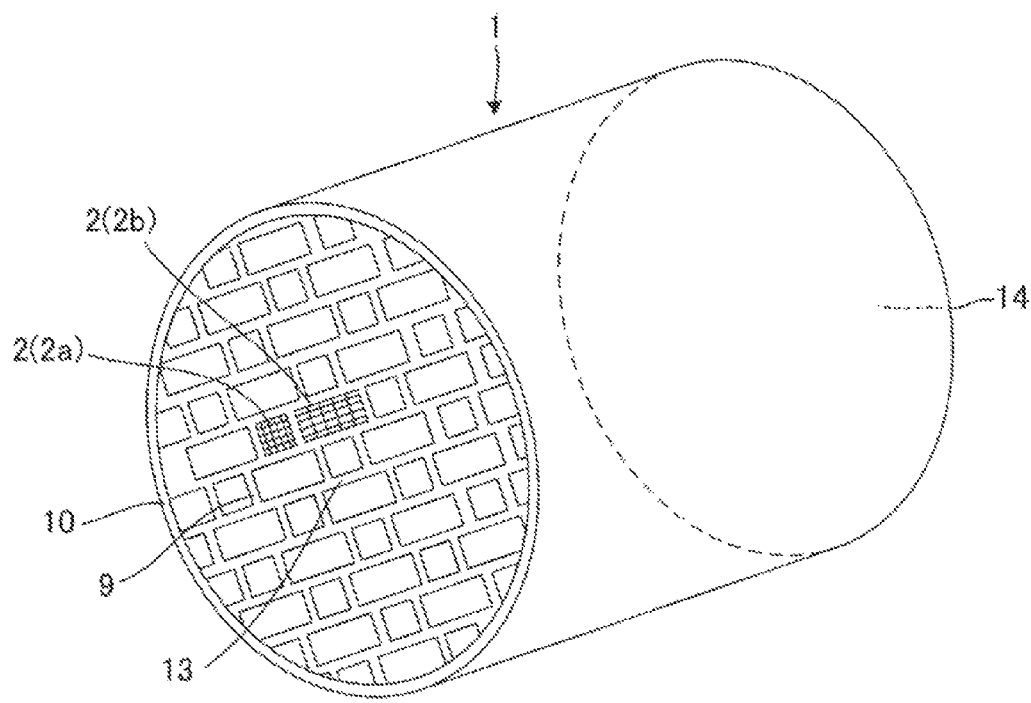
FIG. 1 is a schematic perspective view showing one example of an embodiment of a honeycomb structure according to the present invention.
Figure 2:
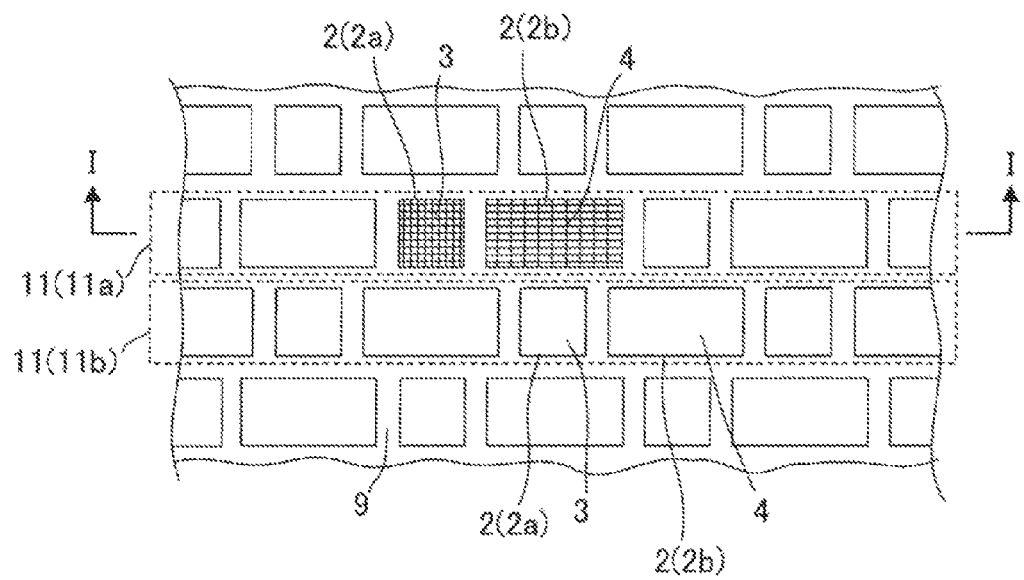
FIG. 2 is a schematic plan view showing a part of an end surface in the one example of the embodiment of the honeycomb structure according to the present invention.
Figure 3:
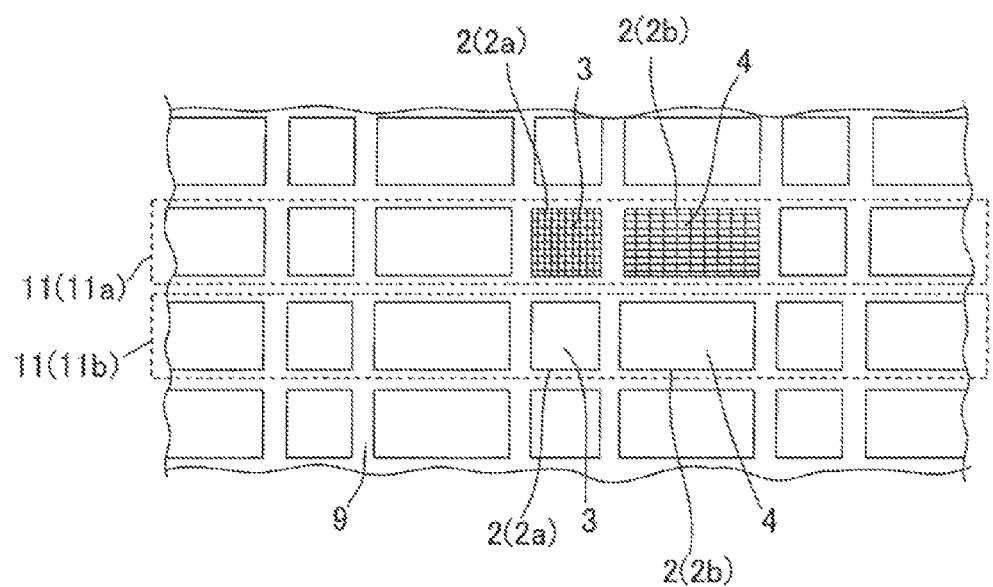
FIG. 3 is a schematic plan view showing a part of an end surface of another example of the embodiment of the honeycomb structure according to the present invention.
Figure 4:
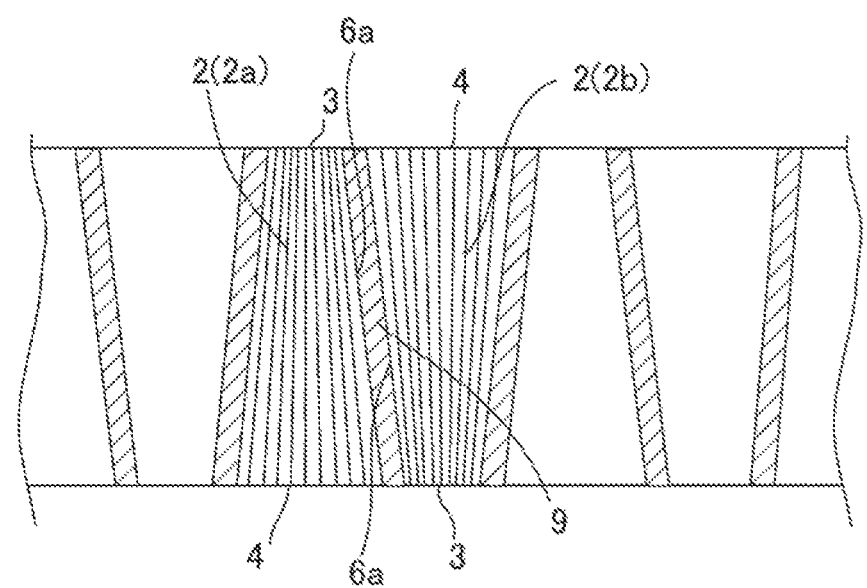
FIG. 4 is a sectional view cut along the I-I line of FIG. 2.
Figure 5:
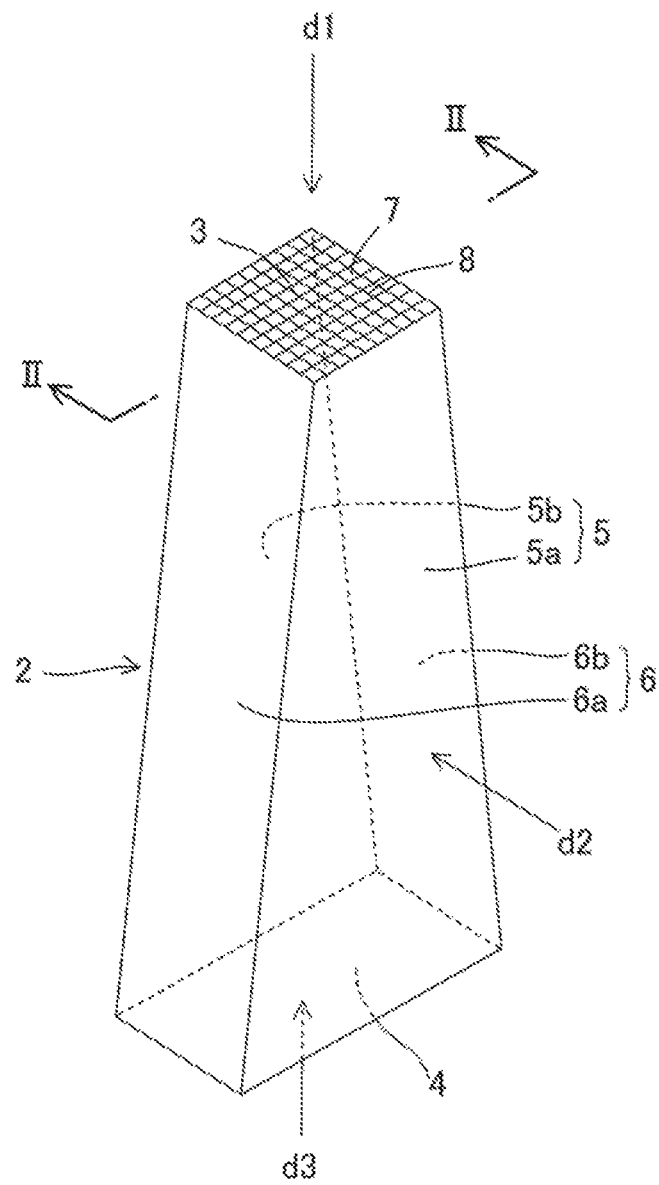
FIG. 5 is a schematic perspective view of a honeycomb segment used in the one example of the embodiment of the honeycomb structure according to the present invention.
Figure 6:
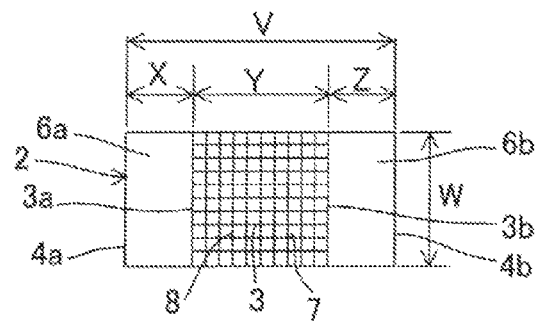
FIG. 6 is a schematic plan view of the honeycomb segment seen from a direction d1 of FIG. 5.
Figure 7:
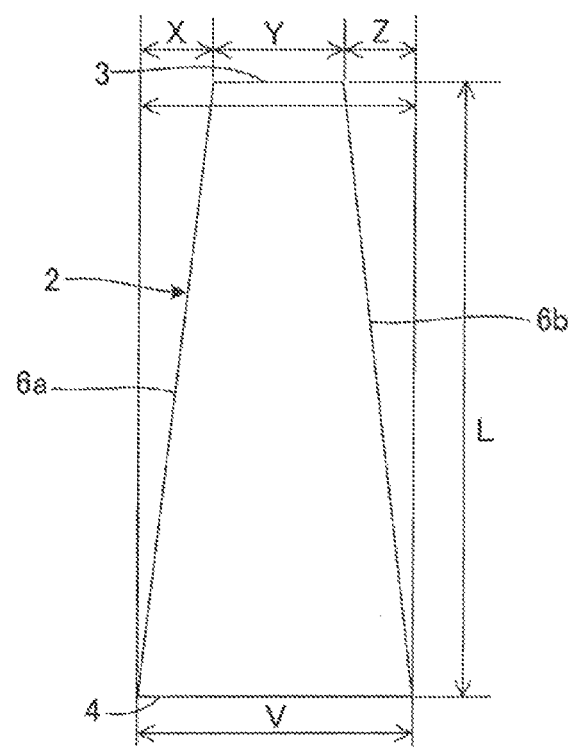
FIG. 7 is a schematic plan view of the honeycomb segment seen from a direction d2 of FIG. 5.
Figure 8:
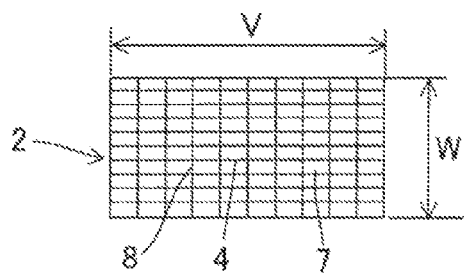
FIG. 8 is a schematic plan view of the honeycomb segment seen from a direction d3 of FIG. 5.
Figure 9:
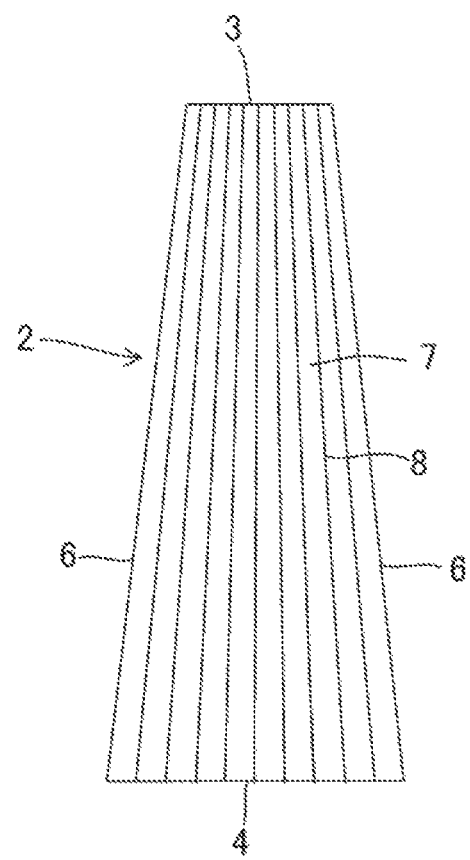
FIG. 9 is a sectional view cut along the II-II line of FIG. 5.
Figure 10:
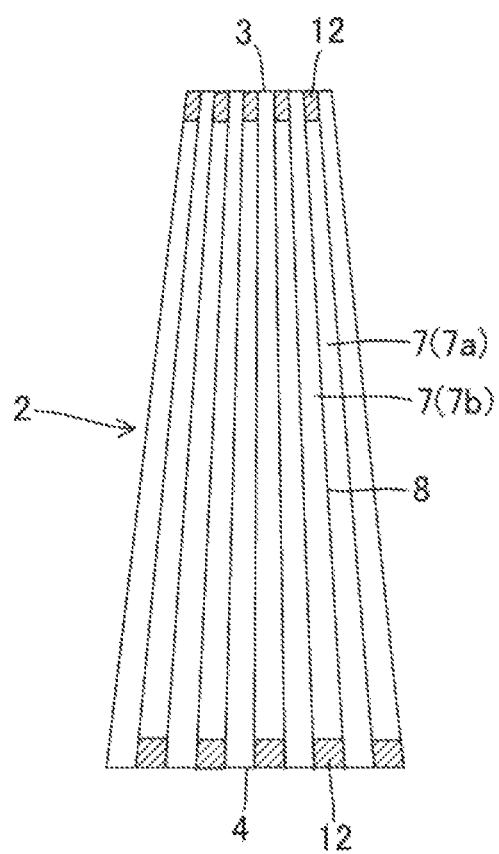
FIG. 10 is a schematic sectional view showing a state where plugging portions are formed in the honeycomb segment.

(1) Honeycomb Structure:

FIG. 1 is a schematic perspective view showing one example of an embodiment of a honeycomb structure according to the present invention. FIG. 2 is a schematic plan view showing a part of an end surface in the one example of the embodiment of the honeycomb structure according to the present invention, FIG. 3 is a schematic plan view showing a part of an end surface of another example of the embodiment of the honeycomb structure according to the present invention, and FIG. 4 is a sectional view cut along the I-I line of FIG. 2. FIG. 5 is a schematic perspective view of a honeycomb segment for use in the one example of the embodiment of the honeycomb structure according to the present invention. FIG. 6 is a schematic plan view of the honeycomb segment seen from a direction d1 of FIG. 5, FIG. 7 is a schematic plan view of the honeycomb segment seen from a direction d2 of FIG. 5, FIG. 8 is a schematic plan view of the honeycomb segment seen from a direction d3 of FIG. 5, and FIG. 9 is a sectional view cut along the II-II line of FIG. 5. FIG. 10 is a schematic sectional view showing a state where plugging portions are formed in the honeycomb segment. It is to be noted that in FIGS. 1 to 4, the partition wall portions of the honeycomb segments except some of the segments are not depicted. Furthermore, in the present description, "an axial direction of cells" means "a length direction of the cells" or "an extending direction of partition walls". Furthermore, "an axial direction of the honeycomb segment" means "a length direction of the honeycomb segment" or "a direction vertical to a first end surface and a second end surface of the honeycomb segment". Furthermore, "an axial direction of the honeycomb structure" means "a length direction of the honeycomb structure" or "a direction vertical to both of end surfaces (an inlet end surface and an outlet end surface) of the honeycomb structure".

In a honeycomb structure 1 according to the present invention, a plurality of honeycomb segments 2 are integrally bonded via a bonding material 9. In the honeycomb structure 1, one end surface is an inlet end surface 13 on an inlet side of a fluid such as an exhaust gas, and the other end surface is an outlet end surface 14 on an outlet side of the fluid. Each of the honeycomb segments 2 has a first end surface 3, a second end surface 4, porous partition walls 8 to define and form a plurality of cells 7 extending from the first end surface 3 to the second end surface 4, and an outer peripheral surface connecting the first end surface 3 to the second end surface 4.

In the present invention, each of the honeycomb segments other than the honeycomb segments positioned in the outermost periphery of the honeycomb structure among the plurality of honeycomb segments 2 constituting the honeycomb structure 1 has a shape satisfying specific conditions. Specifically, first, the first end surface 3 has a quadrangular shape, and the second end surface 4 has a quadrangular shape having an area larger than that of the first end surface 3. However, it is necessary to satisfy the conditions that S1/S2 is 0.8 or more, where S1 is the area of the first end surface 3 and S2 is the area of the second end surface 4. Here, note that honeycomb segments positioned in the outermost periphery of the honeycomb structure have substantially the same structure as those constituting the remaining portions of the honeycomb structure, as mentioned above. However, they are different from such honeycomb segments constituting the remaining portions in the point that the outermost peripheries of the respective honeycomb segments positioned in the outermost periphery of the honeycomb structure have outer periphery coating layers formed by coating processed surfaces with the outer periphery processing with outer periphery coating material.

The outer peripheral surface of the honeycomb segment 2 includes four side surfaces. These four side surfaces are constituted of a pair of parallel side surfaces 5 including two side surfaces 5a, 5b facing each other in parallel and a pair of tapered side surfaces 6 including two side surfaces 6a, 6b facing each other so that a distance between the tapered side surfaces narrows from the side of the second end surface 4 toward the side of the first end surface 3.

Furthermore, as shown in FIG. 6, when the first end surface is seen from a vertical direction thereto, both of a distance X between a side 3a and a side 4a (the distance shown in the left side of FIG. 6) and a distance Z between a side 3b and a side 4b (the distance shown in the right side of FIG. 6) are from 0.3 to 7 mm. It is to be noted that the side 3a is a side constituting the shape of the first end surface 3 and coming in contact with one side surface 6a in the pair of tapered side surfaces 6, i.e., a side shared by a side constituting a shape of the side surface 6a. The side 4a is a side constituting the shape of the second end surface 4 and coming in contact with one side surface 6a in the pair of tapered side surfaces 6, i.e., a side shared by the side constituting the shape of the side surface 6a. The side 3b is a side constituting the shape of the first end surface 3 and coming in contact with the other side surface 6b in the pair of tapered side surfaces 6, i.e., a side shared by a side constituting a shape of the side surface 6b. The side 4b is a side constituting the shape of the second end surface 4 and coming in contact with the other side surface 6b in the pair of tapered side surfaces 6, i.e., the side shared by the side constituting the shape of the side surface 6b.

It is to be noted that symbols concerning honeycomb segment dimensions other than X and Z in FIGS. 6 to 8 will be described. L is a distance between the first end surface 3 and the second end surface 4, i.e., a length of the honeycomb segment 2. W is a distance between the side surface 5a and the side surface 5b constituting the pair of parallel side surfaces 5, i.e., a thickness of the honeycomb segment 2. The side surface 5a is parallel to the side surface 5b, and hence a value of this W is the same value on both of the first end surface 3 side and the second end surface 4 side. Y is a dimension of the first end surface 3 in a direction parallel to the pair of parallel side surfaces 5. V is a dimension of the second end surface 4 in the direction parallel to the pair of parallel side surfaces 5. A product of W and Y is the area (S1) of the first end surface 3 and a product of W and V is the area (S2) of the second end surface 4.

In the present invention, in addition to the above-mentioned specific shape of the honeycomb segments 2, the arrangement of the honeycomb segments 2 also needs to satisfy specific conditions. Specifically, as shown in FIG. 2, the plurality of honeycomb segments 2 are disposed to constitute a plurality of parallel rows 11 extending in a predetermined direction on an end surface of the honeycomb structure.

Furthermore, the honeycomb segments 2 constituting the respective rows 11 have a relation between adjacent honeycomb segments 2a and 2b in which as shown in FIG. 4, the first end surfaces 3 of the respective honeycomb segments 2a and 2b are directed opposite to each other. Furthermore, in the relation between the adjacent honeycomb segments 2a and 2b (this combination of those segments is sometimes referred to as a unit segment in this specification), the side surfaces 6a on one side of the pair of tapered side surfaces of each of the pair of honeycomb segments 2a and 2b face each other via the bonding material 9. It is to be noted that when the first end surfaces 3 of the respective honeycomb segments 2a and 2b are directed opposite to each other in the relation between the adjacent honeycomb segments 2a and 2b, the second end surfaces 4 of the respective honeycomb segments 2a and 2b are also necessarily directed opposite to each other.

It is to be noted that in FIG. 2, in the relation between adjacent rows 11a and 11b, the honeycomb segments having been aligned with first end surfaces in the same direction each other and included in the adjacent rows are slightly dislocated, each other in an extending direction of the rows. However, in the honeycomb structure of the present invention, the relation between the adjacent rows 11a and 11b is not limited to such a state as shown in FIG. 2. That is, as in another embodiment shown in FIG. 3, in a relation between adjacent rows 11a and 11b, positions of honeycomb segments 2a included in the adjacent rows 11a and 11b, respectively, and having the same direction of first end surfaces 3 are matched in a row extending direction.

The honeycomb structure of the present invention is constituted so that the shape and arrangement of the honeycomb segments satisfy the specific conditions as described above, whereby the honeycomb structure has a strong structure where a fixing force of the honeycomb segments is high. In consequence, even when this honeycomb structure is used in a filter to be disposed in an exhaust system of a diesel engine, a gasoline engine or the like, movement (shift) of the honeycomb segments due to vibration or exhaust pressure during the use of the filter does not easily occur.

In such a conventional usual honeycomb segment (a honeycomb segment whose outer shape is a quadrangular pillar-like shape) as described in Patent Document 1, a pair of facing side surfaces are parallel to each other and another pair of facing side surfaces are also parallel to each other among the four side surfaces. On the other hand, in the honeycomb segment for use in the present invention, a first pair of facing side surfaces are parallel to each other similarly to the conventional honeycomb segment, while a distance between a second pair of facing side surfaces gradually becomes narrow from the second end surface side toward the first end surface side. Although a difference in outer shape between the honeycomb segments between the present ones and the conventional ones only is such a degree, in the honeycomb structure of the present invention, the movement (shift) of the honeycomb segments due to the vibration or the exhaust pressure does not easily occur as compared with the conventional honeycomb structure. This is supposedly because, in the honeycomb structure of the present invention only the second pairs of the side surfaces of the honeycomb segments mutually bites into each other in the honeycomb structure in the form of a wedge and accordingly the segments do not easily move from each other, and a bonding area among them increases.

Furthermore, the honeycomb structure of the present invention, during the manufacturing thereof, does not require any step that makes it difficult to assemble the honeycomb structure, for example, a step of changing a thickness of a bonding material between one end surface and the other end surface of the honeycomb structure as in a honeycomb structure described in Patent Document 2, and hence the honeycomb structure of the present invention can comparatively simply be manufactured.

In the honeycomb segment for use in the present invention, the plurality of cells defined and formed by the porous partition walls extend from the first end surface to the second end surface. Therefore, the number of the cells opened in the first end surface is the same as that of the cells opened in the second end surface. However, as described above, the area of the first end surface is different from that of the second end surface, and hence usually in a cross section of the cells, the directions of all partition walls aligned along with the second pair of the side surfaces are not the same, like those parallel to the first pair of the side surfaces. That is, as shown in FIG. 9, the directions of the partition walls of cells 7 present at positions located near to the center of the distance from both sides of the second pair of side surfaces 6 are substantially parallel to the axial direction (the length direction) of the honeycomb segment 2, but the directions of those present at positions close to the second pair of side surfaces 6 incline to the axial direction of the honeycomb segment 2. Furthermore, the inclination is larger in the cells 7 closer to the second pair of side surfaces 6.

When the axial direction of the honeycomb segment is aligned with the axial direction of the honeycomb structure, the exhaust gas flowing along the axial direction of the honeycomb structure easily comes in contact with the partition walls of the cells whose axial directions incline to the axial direction of the honeycomb segment. Therefore, when the honeycomb structure of the present invention is used in the filter, a PM collecting efficiency enhances. Furthermore, in the honeycomb segments positioned in the outermost periphery of the honeycomb structure, among part of the cells whose axial directions incline to the axial directions of the honeycomb segments, the cells having a large degree of the inclination are formed as dead channels into which the exhaust gas hardly flows, by the grind processing of an outer periphery of the honeycomb structure. Furthermore, a warmth retaining effect is produced by the cells as the dead channels, and a heating efficiency during filter regeneration enhances.

In the present invention, as described above, S1/S2 is 0.8 or more, where S1 is the area of the first end surface 3 and S2 is the area of the second end surface 4. When S1/S2 is smaller than 0.8, a pressure loss of the honeycomb structure increases due to the decrease of a sectional area of each cell. When the honeycomb structure is used as a PM collecting filter to be disposed in the exhaust system of the engine, the lowering of an output of the engine is incurred sometimes. It is to be noted that from the viewpoint of the suppression of the increase of the pressure loss, S1/S2 is preferably 0.82 or more and especially preferably 0.89 or more. However, in the present invention, the area of the second end surface 4 is larger than the area of the first end surface 3, and hence S1/S2 cannot be 1 or more.

Furthermore, in the present invention, as described above, when the first end surface 3 is seen from the vertical direction thereto, both of the distance X and the distance Z shown in FIG. 6 are from 0.3 to 7 mm. When the distance X and/or the distance Z is smaller than 0.3 mm, the movement of the honeycomb segments due to the vibration or the exhaust pressure cannot sufficiently be suppressed sometimes. Furthermore, when the distance X and/or the distance Z exceed 7 mm, the sectional area of each cell decreases, and a direction in which the exhaust gas flows noticeably changes, so that the pressure loss of the honeycomb structure increases. Additionally, when the honeycomb structure is used as the PM collecting filter to be disposed in the exhaust system of the engine, the lowering of the output of the engine is incurred sometimes.

It is to be noted that from the viewpoints of the suppression of the movement of the honeycomb segments due to the vibration or the exhaust pressure and the suppression of the increase of the pressure loss, both of the distance X and the distance Z are preferably from 0.3 to 5 mm and especially preferably from 0.5 to 3 mm. Furthermore, the distance X and the distance Z may have the same value or different values.

In the present invention, each corner portion of a cross section perpendicular to the length direction of the honeycomb segment 2 is preferably formed into a circular shape having a radius of 0.1 to 5 mm. When the corner portion is formed into the circular shape in this manner, concentration of stress onto the corner portion can be suppressed, and the honeycomb segment 2 is not easily damaged.

In the present invention, a material of the honeycomb segments 2 preferably contains, as a main component, at least one selected from the group consisting of cordierite, silicon carbide, mullite, aluminum titanate, zeolite, vanadium and alumina. Here, "the main composition" means a component in excess of 50 mass % of the whole material.

An average pore diameter of the partition walls 8 of the honeycomb segments 2 is preferably from 5 to 100 µm and especially preferably from 8 to 50 When the average pore diameter of the partition walls 8 is smaller than 5 µm, the pressure loss of the resulting honeycomb structure increases. When the resulting honeycomb structure is used as the PM collecting filter to be disposed in the exhaust system of the engine, the lowering of the output of the engine is incurred sometimes. Moreover, when the average pore diameter of the partition walls 8 exceeds 100 lam, a sufficient strength cannot be obtained sometimes. It is to be noted that "the average pore diameter" mentioned herein is a value measured by a mercury porosimeter.

A porosity of the partition walls 8 of the honeycomb segments 2 is preferably from 30 to 80% and especially preferably from 35 to 75%. When the porosity of the partition walls 8 is smaller than 30%, the pressure loss of the honeycomb structure increases. Furthermore, when the resulting honeycomb structure is used as the PM collecting filter to be disposed in the exhaust system of the engine, the lowering of the output of the engine is incurred sometimes. Moreover, when the porosity of the partition walls 8 exceeds 80%, the sufficient strength cannot be obtained sometimes. It is to be noted that "the porosity" mentioned herein is a value measured by the mercury porosimeter.

A thickness of the partition walls 8 of the honeycomb segments 2 is preferably from 40 to 600 µm and especially preferably from 100 to 400 µm. When the thickness of the partition walls 8 is smaller than 40 µm, the sufficient strength cannot be obtained sometimes. Furthermore, when the thickness of the partition walls 8 exceeds 600 µm, the pressure loss of the resulting honeycomb structure increases. Furthermore, when the resulting honeycomb structure is used as the PM collecting filter to be disposed in the exhaust system of the engine, the lowering of the output of the engine is sometimes brought into.

In the present invention, a thickness of the bonding material 9, i.e., bonding layer which integrally bonds the plurality of honeycomb segments 2 is preferably from 0.05 to 3.0 mm. There is not any special restriction on a material of the bonding material 9, and an example of the material is preferably a material in which ceramic particles of silicon carbide, alumina, silicon nitride or the like or inorganic fibers are bound by colloidal silica or colloidal alumina. The bonding material of such a material can effectively relax heat stress, when the heat stress is generated in the honeycomb structure.

There is not any special restriction on a shape (an outer shape) of the honeycomb structure 1 of the present invention, and examples of the shape include a columnar shape, an elliptic pillar shape, and a polygonal pillar shape. It is to be noted that to obtain a desirable shape of the honeycomb structure of the present invention, the plurality of honeycomb segments are bonded by the bonding material, and then the outer periphery grind processing is preferably performed. By this outer periphery grind processing, as consequence, the honeycomb segments positioned in the outermost periphery of the processed honeycomb structure have a shape different from that of the other honeycomb segments (hereinafter referred to as "complete segments" sometimes). That is, part of the honeycomb segments positioned in the outermost periphery of the assembled honeycomb structure are removed by the outer periphery grind processing, and hence the shape of those segments has a lacked portion due to the removed part by processing, compared with the complete honeycomb segment. In the processed surface subjected to the outer periphery grind processing (the processed outer peripheral surface of the honeycomb structure), the cells are exposed. Therefore, as shown in FIG. 1, an outer periphery coating layer 10 is preferably formed on the processed surface. In a forming material of the outer periphery coating layer 10, the same material as the forming material of the bonding material is preferably used.

Also in the present invention, there is not any special restriction also on a cell shape of the honeycomb segment (a shape of the cells in a cross section perpendicular to the axial direction of the cells), but examples of the shape preferably include polygonal shapes such as a quadrangular shape, a hexagonal shape and an octagonal shape, and any combination of these shapes. For example, the combination of the quadrangular shape and the hexagonal shape or the like is preferable.

When the honeycomb structure of the present invention is used in the PM collecting filter, as shown in FIG. 10, plugging portions 12 are preferably formed to plug open end portions on the first end surface 3 side of predetermined cells 7a and open end portions on the second end surface 4 side of remaining cells 7b in each of the honeycomb segments 2. One open end portion of each of the cells 7 of the honeycomb segment 2 is plugged with the plugging portion 12 in this way, whereby the honeycomb structure becomes a wall flow type filter having a high PM collecting efficiency. In this wall flow type filter, the exhaust gas which has flowed into the cells from the inlet end surface of the honeycomb structure passes the partition walls, and then flows out of the cells from the outlet end surface. Furthermore, when the exhaust gas passes the partition walls, the partition walls function as filter layers, and the PM included in the exhaust gas is collected. It is to be noted that the plugging portions 12 are preferably formed so that the first end surface 3 and the second end surface 4 have checkered patterns, respectively, by the cells 7 having the open end portions plugged with the plugging portions 12 and the cells 7 which do not have the open end portions plugged with the plugging portions 12.

A material of the plugging portions 12 is preferably a material which is considered to be preferable as the material of the honeycomb segments 2. The material of the plugging portions 12 and the material of the honeycomb segments 2 may be the same material or different materials.

(2) Manufacturing Method of Honeycomb Structure:

One example of a manufacturing method of the honeycomb structure according to the present invention will be described. First, to prepare the honeycomb segments, a forming raw material containing a ceramic raw material is prepared. The ceramic raw material to be contained in the forming raw material is preferably at least one selected from the group consisting of a cordierite forming raw material, cordierite, silicon carbide, a silicon-silicon carbide composite material, mullite, aluminum titanate, zeolite, and vanadium. It is to be noted that the cordierite forming raw material is the ceramic raw material blended so as to have a chemical composition in which silica falls in a range of 42 to 56 mass %, alumina falls in a range of 30 to 45 mass % and magnesia falls in a range of 12 to 16 mass %. The cordierite forming raw material is fired to become cordierite.

The forming raw material is preferably prepared by mixing the above-mentioned ceramic raw material with a dispersion medium, an organic binder, an inorganic binder, a pore former, a surfactant and the like. There is not any special restriction on the composition ratio of each raw material, and the composition ratio is preferably determined in accordance with a structure, a material and the like of the honeycomb structure to be prepared.

Next, the forming raw material is kneaded to obtain a kneaded material. There is not any special restriction on a method of kneading the forming raw material to form the kneaded material. An example of the method is preferably a method using a kneader, a vacuum clay kneader or the like.

Next, the kneaded material is extruded to prepare a formed honeycomb body. Here, the formed honeycomb body obtained by the extrusion has a quadrangular pillar-like outer shape in which both of end surfaces have a congruent quadrangular shape. Next, prior to drying this formed honeycomb body, a pair of facing side surfaces of the formed honeycomb body are sandwiched by using two pressing plates having flat surfaces, and the formed honeycomb body is pressurized and deformed so that a distance between the second pair of side surfaces gradually becomes narrow from one end surface side toward the other end surface side. By this pressurizing deformation, the formed honeycomb body can be obtained in which an area of the one end surface (the end surface finally as the first end surface) is smaller than an area of the other end surface (the end surface finally as the second end surface). The formed honeycomb body prior to the drying is soft, and hence the body can easily be pressurized and deformed by using the above-mentioned pressing plates. At this time, when the first pair of facing side surfaces are held to be sandwiched between two flat plates so as to be pressurized or deformed, a flat surface state of the second pair of facing side surfaces that are not to be deformed can preferably be held suitably.

After this pressurizing deformation, thus formed honeycomb body is dried. There is not any special restriction on a drying method, but examples of the drying method preferably include hot air drying, microwave drying, dielectric drying, reduced-pressure drying, vacuum drying, and freeze-drying. Among these methods, the dielectric drying, the microwave drying, the hot air drying or any combination of these methods is preferably performed.

Next, the dried formed honeycomb body (the dried honeycomb body) is fired to prepare the honeycomb segment. It is to be noted that prior to this firing (the final firing), calcinating (degreasing) is preferably performed to remove the binder and the like included in the dried formed honeycomb body. There is not any special restriction on calcinating conditions, as long as organic substances (the organic binder, the surfactant, the pore former, etc.) included in the honeycomb body can be removed. In general, a burning temperature of the organic binder is from about 100 to 300° C., and a burning temperature of the pore former is from about 200 to 800° C. Therefore, among the calcinating conditions, heating is preferably performed at about 200 to 1000° C. in an oxidation atmosphere for about three to 100 hours. Conditions (temperature, time, atmosphere, etc.) to fire (finally fire) the dried formed honeycomb body may vary in accordance with a type of the forming raw material, and hence suitable conditions may be selected in accordance with the type thereof. For example, when the cordierite forming raw material is used, the firing temperature is preferably from 1410 to 1440° C. Furthermore, the firing time is preferably from four to eight hours, as time to keep the highest temperature. There is not any special restriction on a system which performs the calcinating and the final firing. Examples of a suitable system include an electric furnace and a gas furnace.

When the honeycomb structure including the plugging portions is prepared, the plugging portions are formed in the honeycomb segments after the firing. The plugging portions are formed so as to plug the open end portions on one end surface (the first end surface) side of the predetermined cells, and alternately the open end portions of the remaining cells on the other end surface (the second end surface) side. In this formation of the plugging portions, a heretofore known method can be used. In an example of the specific method, first, a sheet is attached to the end surface of the honeycomb segment prepared by the above-mentioned method. Next, holes are made at positions of this sheet which correspond to the cells to be provided with the plugging portions. Next, the end surface of the honeycomb segment is immersed into a plugging slurry as a slurried forming material of the plugging portions in a state where this sheet is attached as it is, to charge the plugging slurry into the open end portions of the cells which are to be plugged through the holes made in the sheet. The plugging slurry charged in this manner is dried and then fired to harden, whereby the plugging portions are formed. As the forming material of the plugging portions, the same material as the forming material of the honeycomb segments is preferably used. It is to be noted that the formation of the plugging portions may be performed in any stage after the drying of the formed honeycomb body and after the calcinating or the firing (the final firing) thereof.

Next, a slurried bonding material is applied to the side surfaces of each obtained honeycomb segment, and the plurality of honeycomb segments are assembled by using the bonding material so that the side surfaces of the honeycomb segments are bonded to one another. During this assembling, the plurality of honeycomb segments is disposed to constitute a plurality of parallel rows extending in a predetermined direction. Furthermore, the honeycomb segments constituting the respective rows are arranged so that in a relation between the adjacent honeycomb segments, the first end surfaces of the respective segments are directed opposite to each other, and the side surfaces on one side of the pair of tapered side surfaces of face each other. The plurality of honeycomb segments are assembled in this manner and the bonding material applied is heated and dried, whereby it is possible to obtain the honeycomb structure in which the plurality of honeycomb segments are integrally bonded via the bonding material.

As the bonding material, it is possible to suitably use, for example, a slurried material obtained by adding additives such as an organic binder, resin balloons or a dispersant and water to an inorganic raw material such as inorganic fibers, colloidal silica, clay or ceramic particles, followed by the kneading. There is not any special restriction on a method of applying the bonding material to the side surfaces of the honeycomb segments, and a method such as brush application can be used.

The plurality of honeycomb segments are bonded by the bonding material, and then if necessary, an outer peripheral portion of the obtained honeycomb structure is subjected to the grind processing, so that the honeycomb structure has a desirable shape such as a columnar shape. In this case, the outer periphery coating layer is preferably formed on the processed surface after the grind processing.

The outer periphery coating layer is formed by applying an outer periphery coating material to the processed surface of the honeycomb structure after the grind processing. As the outer periphery coating material, it is possible to suitably use a slurried material obtained by adding additives such as a binder, resin balloons and a dispersant and water to an inorganic raw material such as inorganic fibers, colloidal silica, clay or ceramic particles, followed by kneading. There is not any special restriction on a method of applying the outer periphery coating material to the processed surface of the honeycomb structure, and an example of the method is preferably a method of coating the processed surface of the honeycomb structure subjected to the grind processing with the outer periphery coating material by a rubber spatula while rotating the honeycomb structure on a potter's wheel.

EXAMPLES

Hereinafter, examples of the present invention will be described in more detail, but the present invention is not limited to these examples.

Examples 1 to 40 and Comparative Examples 1 to 18

80 parts by mass of SiC powder and 20 parts by mass of metal Si powder were mixed to obtain a ceramic raw material. To the obtained ceramic raw material, a pore former, a binder, a surfactant and water were added, to prepare a forming raw material, which was kneaded to obtain a kneaded material. As the pore former, starch was used. Furthermore, as the binder, methylcellulose and hydroxypropoxyl methylcellulose were used. As the surfactant, sodium laurate was used. Amounts of the respective raw materials to be added to 100 parts by mass of the ceramic raw material were 5 parts by mass of the pore former, 3 parts by mass of methylcellulose, 3 parts by mass of hydroxypropoxyl methylcellulose, 1 part by mass of the surfactant, and 32 parts by mass of the water.

The obtained kneaded material was extruded by using a formed honeycomb body forming die, to obtain a formed honeycomb body having a quadrangular pillar-like outer shape in which both of end surfaces had a congruent quadrangular shape. Then, prior to drying this formed honeycomb body, a pair of facing side surfaces of the obtained formed honeycomb body were sandwiched by using two pressing plates having flat surfaces, and the formed honeycomb body was pressurized and deformed so that a dimension between the second pair of side surfaces narrowed from the second end surface side toward the first end surface side. At this time, the pressurizing deformation was performed so that a dimension of the second end surface did not change. Afterward, the formed honeycomb body was dried by microwaves and hot air to obtain a dried honeycomb body.

Next, the plugging portions were formed by plugging alternately open end portions of cells of this dried honeycomb body. The formation of the plugging portions was carried out so that the respective end surfaces of the dried honeycomb body had checkered patterns by the cells in which the plugging portions were formed in the open end portions and the cells in which the plugging portions were not formed in the open end portions. As a method of forming the plugging portions, first, a sheet was attached to the end surface of the dried honeycomb body, and holes were made at positions of this sheet which corresponded to the cells to be provided with the plugging portions. Next, the end surface of the dried honeycomb body was immersed into a plugging slurry as a slurried forming material of the plugging portions in a state where this sheet was attached as it was, to charge the plugging slurry into the open end portions of the cells which were to be plugged through the holes made in the sheet. Additionally, as the forming material of the plugging portions, the same material as the forming raw material was used.

The plugging slurry charged alternately into the open end portions of the cells in this manner was dried and then this dried honeycomb body was calcinated (degreased) at about 400° C. in the air atmosphere. Afterward, the honeycomb body was fired at about 1450° C. in an Ar inert atmosphere to obtain a honeycomb segment in which values of L, V, W, X, Y and Z shown in FIGS. 6 to 8 and a value of an area ratio (S1/S2) between an area Si of the first end surface and an area S2 of the second end surface were values shown in Tables 1 to 3. Additionally, in these honeycomb segments, a porosity was 450, an average pore diameter was 10 the number of cells in a second end surface was 62 cells/cm$^2$, and a thickness of partition walls in the second end surface was 0.15 mm.

Next, silica fibers, an organic binder and water were added to alumina powder to obtain a slurried bonding material. This binding material was applied to a side surface of the honeycomb segment in a thickness of about 1 mm, and the plurality of honeycomb segments were assembled so that the side surfaces of the honeycomb segments were bonded to one another by this bonding material. During this assembling, as shown in FIG. 2 or FIG. 3, a plurality of honeycomb segments 2 were disposed to constitute a plurality of parallel rows 11 extending in a predetermined direction. Furthermore, the honeycomb segments 2 constituting the respective rows 11 had a relation between adjacent honeycomb segments 2a and 2b as a unit segment in which as shown in FIG. 4, first end surfaces 3 of the respective honeycomb segments were directed opposite to each other, and side surfaces 6a on one side of the pair of tapered side surfaces faced each other. Additionally, in Examples 1 to 30 and Comparative Examples 1 to 14, as shown in FIG. 3, the honeycomb segments were arranged so that positions of the honeycomb segments 2a included in adjacent rows 11a and 11b, respectively, and having the same direction of the first end surfaces 3 were matched in a row extending direction. Moreover, in Examples 31 to 40 and Comparative Examples 15 to 18, as shown in FIG. 2, the honeycomb segments were arranged so that positions of the honeycomb segments 2a included in the adjacent rows 11a and 11b, respectively, and having the same direction of the first end surfaces 3 were shifted every ½ of a size of the first end surface 3 or a second end surface 4 in the row extending direction. Then, the honeycomb segments were dried at 120° C. for two hours while pressing the honeycomb segments to one another by suitably applying a pressure thereto from the outside, to obtain a honeycomb structure.

Next, an outer periphery of the honeycomb structure was subjected to grind processing so that an outer shape of thus obtained honeycomb structure was a columnar shape having a diameter of 210 mm. After the grind processing, an outer periphery coating material of the same composition as in the bonding material was applied to the processed surface of the honeycomb structure in a thickness of 0.5 mm, and dried and hardened at 700° C. for two hours, to form an outer periphery coating layer, whereby the honeycomb structures of Examples 1 to 40 and Comparative Examples 1 to 18 and Comparative Example 19 described below were obtained.

Comparative Example 19

The Honeycomb Structure as a Reference of Evaluation

The honeycomb structure of Comparative Example 19 was obtained by a method similar to those of Examples 1 to 40 and Comparative Examples 1 to 18 except that pressurizing deformation of each formed honeycomb body was not performed, two facing side surfaces in each of two pairs of side surfaces were parallel to each other, and a dimension of a first end surface was the same as that of a second end surface as it was. The pressurizing deformation of the formed honeycomb body was not performed, and hence in the obtained honeycomb structure, axial directions of all cells were the same as an axial direction of a honeycomb segment. It is to be noted that the honeycomb structure of Comparative Example 19 is not a single honeycomb structure, but includes a plurality of honeycomb structures constituted by using honeycomb segments prepared so that the dimensions, i.e., values of V and W of both the first and the second end surfaces of each honeycomb segment have the same each other, and the same as that of the second end surface of each honeycomb segment constituting each of the honeycomb structures of Examples 1 to 40 and Comparative Examples 1 to 18. Furthermore, this honeycomb structure of Comparative Example 19 is a honeycomb structure as a reference of evaluation in after-mentioned "heating vibration test", "pressure loss" and "the number of discharged PM particles". That is, when the performances of honeycomb structures of Examples 1 to 40 and Comparative Examples 1 to 18 were evaluated, the honeycomb structure of Comparative Example 19 constituted by using the honeycomb segments each having the same dimension at the first and second end surfaces is used as the reference for the evaluation.

(Evaluation)

As to each of the honeycomb structures of Examples 1 to 40 and Comparative Examples 1 to 19, the heating vibration test, the measurement of the pressure loss and the measurement of the number of the discharged PM particles were carried out by methods described in the following. Then, on the basis of the test results or the measurement results, the evaluation was carried out in four stages of A, B, C and D, and the evaluation results are shown in Tables 1 to 3.

[Heating Vibration Test]

A ceramic non-intumescent mat was wound around an outer periphery of each honeycomb structure, the honeycomb structure was pushed into a canning member made of stainless steel (SUS430) to obtain a canned structure, and then the heating vibration test was carried out. Test conditions were set to an inlet gas temperature of 950° C., a vibration acceleration of 50 G and a vibration frequency of 200 Hz, and the vibration was applied in an axial direction of the honeycomb structure while allowing a heated exhaust gas to flow into the canned structure continuously for 200 hours. Evaluation standards of this test are as follow.

A: After the heating vibration test, any movement is not observed in any honeycomb segment of the honeycomb structure removed by disassembling the can member, and even when the periphery of the honeycomb structure is strongly pushed by hand with a force of about 5 kg, any honeycomb segment does not move.

B: After the heating vibration test, any movement is not observed in any honeycomb segment of the honeycomb structure removed by disassembling the canning member, but when the periphery of the honeycomb structure is strongly pushed by hand with the force of about 5 kg, the honeycomb segments move.

C: After the heating vibration test, the movement is observed in at least one honeycomb segment of the honeycomb structure, but a movement amount of the honeycomb segment which moves most is 0.5 mm or less.

D: After the heating vibration test, the movement is observed in at least one honeycomb segment of the honeycomb structure, and the movement amount of the honeycomb segment which moves most exceeds 0.5 mm.

It is to be noted that in the honeycomb structures of the evaluation results A to C in the evaluation of this heating vibration test, the movement of the honeycomb segments due to vibration or exhaust pressure can effectively be suppressed, and it can be considered that there are not any problems in usual use as a filter. On the other hand, in the honeycomb structure of the evaluation result D, the movement of the honeycomb segments due to the vibration or the exhaust pressure cannot sufficiently be suppressed, and there is the possibility that a problem occurs in the usual use as the filter.

[Pressure Loss]

In each honeycomb structure, air of an atmospheric pressure (1 atm) and room temperature (20° C.) was allowed to flow at 12 m$^3$/minute, thereby measuring the pressure loss. On the basis of this measurement result, the pressure loss was evaluated. Evaluation standards are as follows.

A: A relative pressure loss is 102% or less, when the pressure loss of the honeycomb structure of Comparative Example 19 is taken as 100%.

B: The relative pressure loss exceeds 102% and 104% or less, when the pressure loss of the honeycomb structure of Comparative Example 19 is taken as 100%.

C: The relative pressure loss exceeds 104% and 106% or less, when the pressure loss of the honeycomb structure of Comparative Example 19 is taken as 100%.

D: The relative pressure loss exceeds 106%, when the pressure loss of the honeycomb structure of Comparative Example 19 is taken as 100%.

It is to be noted that in the honeycomb structures of the evaluation results A to C in the evaluation of this pressure loss, an engine performance is influenced less, and there are not any problems in the usual use as the filter. On the other hand, in the honeycomb structure of the evaluation result D, the pressure loss is high to such an extent that the influence on the engine performance is not negligible, and the honeycomb structure is not suitable for the use as the filter.

[Number of Discharged PM Particles]

A ceramic non-intumescent mat was wound around an outer periphery of each honeycomb structure, the honeycomb structure was pushed into a canning member made of stainless steel to obtain a canned structure, and then the structure was disposed on an outlet side of an engine exhaust manifold of a 4-cylinders diesel engine car of a displacement of 2.0 L. Furthermore, when this diesel engine car was run in a new European driving cycle (NEDC) mode on a chassis dynamo, the number of the discharged PM particles (particles/km) was measured. On the basis of this measurement result, the evaluation of the number of the discharged PM particles was performed. Evaluation standards are as follows.

A: As compared with the number of the discharged PM particles of the honeycomb structure of Comparative Example 19, the number of the discharged PM particles decreases as much as 300 or more.

B: As compared with the number of the discharged PM particles of the honeycomb structure of Comparative Example 19, the number of the discharged PM particles decreases in a range of 100 or more and smaller than 30%.

C: As compared with the number of the discharged PM particles of the honeycomb structure of Comparative Example 19, the number of the discharged PM particles is equal or only decreases less than 10%.

D: As compared with the number of the discharged PM particles of the honeycomb structure of Comparative Example 19, the number of the discharged PM particles increases.

It is to be noted that in the honeycomb structures of the evaluation results A to C in the evaluation of this number of the discharged PM particles, a PM collecting performance is suitable, and there are not any problems in the usual use as the filter. On the other hand, in the honeycomb structure of the evaluation result D, the PM collecting performance is low, and the honeycomb structure is not suitable for the use as the filter.

TABLE 1

| | Dimension (mm) of honeycomb segment | | | | | | Area ratio (S1/S2) between first end surface and second end surface | Evaluation result | | |
|---|---|---|---|---|---|---|---|---|---|---|
| | L | V | W | X | Y | Z | | Heating vibration test | Pressure loss | No. of discharged PM particles |
| Example 1 | 150 | 35 | 35 | 0.3 | 34.4 | 0.3 | 0.983 | C | A | B |
| Example 2 | 150 | 35 | 35 | 0.5 | 34 | 0.5 | 0.971 | A | A | B |
| Example 3 | 150 | 35 | 35 | 0.3 | 34 | 0.7 | 0.971 | B | A | B |
| Example 4 | 150 | 35 | 35 | 1 | 33 | 1 | 0.943 | A | A | A |
| Example 5 | 150 | 35 | 35 | 0.3 | 33 | 1.7 | 0.943 | B | A | A |
| Example 6 | 150 | 35 | 35 | 3 | 29 | 3 | 0.829 | A | B | A |
| Example 7 | 150 | 35 | 35 | 0.3 | 29 | 5.7 | 0.829 | B | B | A |
| Example 8 | 150 | 35 | 35 | 3.5 | 28 | 3.5 | 0.800 | A | C | A |
| Example 9 | 150 | 35 | 35 | 2 | 28 | 5 | 0.800 | A | C | A |
| Example 10 | 150 | 35 | 35 | 0.3 | 28 | 6.7 | 0.800 | B | C | A |
| Example 11 | 150 | 35 | 25 | 0.3 | 34.4 | 0.3 | 0.983 | C | A | B |
| Example 12 | 150 | 35 | 25 | 0.5 | 34 | 0.5 | 0.971 | A | A | B |
| Example 13 | 150 | 35 | 25 | 0.3 | 34 | 0.7 | 0.971 | B | A | B |
| Example 14 | 150 | 35 | 25 | 1 | 33 | 1 | 0.943 | A | A | A |
| Example 15 | 150 | 35 | 25 | 0.3 | 33 | 1.7 | 0.943 | B | A | A |
| Example 16 | 150 | 35 | 25 | 3 | 29 | 3 | 0.829 | A | B | A |
| Example 17 | 150 | 35 | 25 | 0.3 | 29 | 5.7 | 0.829 | B | B | A |
| Example 18 | 150 | 35 | 25 | 3.5 | 28 | 3.5 | 0.800 | A | C | A |
| Example 19 | 150 | 35 | 25 | 2 | 28 | 5 | 0.800 | A | C | A |
| Example 20 | 150 | 35 | 25 | 0.3 | 28 | 6.7 | 0.800 | B | C | A |

TABLE 2

| | Dimension (mm) of honeycomb segment | | | | | | Area ratio (S1/S2) between first end surface and second end surface | Evaluation result | | |
|---|---|---|---|---|---|---|---|---|---|---|
| | L | V | W | X | Y | Z | | Heating vibration test | Pressure loss | No. of discharged PM particles |
| Example 21 | 250 | 50 | 50 | 0.3 | 49.4 | 0.3 | 0.988 | C | A | B |
| Example 22 | 250 | 50 | 50 | 3 | 44 | 3 | 0.880 | A | B | A |
| Example 23 | 250 | 50 | 50 | 5 | 40 | 5 | 0.800 | A | C | A |
| Example 24 | 250 | 50 | 50 | 0.3 | 42.7 | 7 | 0.854 | B | B | A |
| Example 25 | 300 | 50 | 50 | 0.3 | 49.4 | 0.3 | 0.988 | B | A | B |
| Example 26 | 150 | 25.6 | 25 | 0.3 | 25 | 0.3 | 0.977 | B | A | B |
| Example 27 | 150 | 27 | 25 | 1 | 25 | 1 | 0.926 | A | A | A |
| Example 28 | 150 | 28 | 25 | 1 | 25 | 2 | 0.893 | A | A | A |
| Example 29 | 150 | 31.2 | 25 | 3.1 | 25 | 3.1 | 0.801 | A | C | A |
| Example 30 | 150 | 31.2 | 25 | 0.3 | 25 | 5.9 | 0.801 | B | C | A |
| Example 31 | 150 | 35 | 35 | 0.3 | 34.4 | 0.3 | 0.983 | C | A | B |
| Example 32 | 150 | 35 | 35 | 0.3 | 33 | 1.7 | 0.943 | B | A | A |
| Example 33 | 150 | 35 | 35 | 3 | 29 | 3 | 0.829 | A | B | A |
| Example 34 | 150 | 35 | 35 | 2 | 28 | 5 | 0.800 | A | C | A |
| Example 35 | 150 | 35 | 35 | 0.3 | 28 | 6.7 | 0.800 | B | C | A |
| Example 36 | 150 | 35 | 25 | 0.3 | 28 | 6.7 | 0.800 | B | C | A |
| Example 37 | 250 | 50 | 50 | 0.3 | 49.4 | 0.3 | 0.988 | C | A | B |
| Example 38 | 300 | 50 | 50 | 0.3 | 49.4 | 0.3 | 0.988 | C | A | B |
| Example 39 | 150 | 25.6 | 25 | 0.3 | 25 | 0.3 | 0.977 | C | A | B |
| Example 40 | 150 | 31.2 | 25 | 3.1 | 25 | 3.1 | 0.801 | A | C | A |

TABLE 3

| | Dimension (mm) of honeycomb segment | | | | | Area ratio (S1/S2) between first end surface and second end surface | Evaluation result | | |
|---|---|---|---|---|---|---|---|---|---|---|
| | L | V | W | X | Y | Z | | Heating vibration test | Pressure loss | No. of discharged PM particles |
| Comparative Example 1 | 150 | 35 | 35 | 0.2 | 34.5 | 0.3 | 0.986 | D | A | C |
| Comparative Example 2 | 150 | 35 | 35 | 0.2 | 28.1 | 6.7 | 0.803 | D | C | B |
| Comparative Example 3 | 150 | 35 | 35 | 0.3 | 27.7 | 7 | 0.791 | B | D | A |
| Comparative Example 4 | 150 | 35 | 25 | 0.2 | 34.5 | 0.3 | 0.986 | D | A | C |
| Comparative Example 5 | 150 | 35 | 25 | 0.3 | 27.7 | 7 | 0.791 | B | D | A |
| Comparative Example 6 | 150 | 35 | 25 | 3.8 | 27.4 | 3.8 | 0.783 | A | D | A |
| Comparative Example 7 | 250 | 50 | 50 | 0.3 | 42.5 | 7.2 | 0.850 | B | D | A |
| Comparative Example 8 | 250 | 50 | 50 | 2.5 | 40 | 7.5 | 0.800 | A | D | A |
| Comparative Example 9 | 250 | 50 | 50 | 3 | 39.5 | 7.5 | 0.790 | A | D | A |
| Comparative Example 10 | 250 | 50 | 50 | 5.2 | 39.6 | 5.2 | 0.792 | A | D | A |
| Comparative Example 11 | 150 | 25.4 | 25 | 0.2 | 25 | 0.2 | 0.984 | D | A | D |
| Comparative Example 12 | 150 | 31.6 | 25 | 3.3 | 25 | 3.3 | 0.791 | A | D | A |
| Comparative Example 13 | 300 | 50 | 50 | 2.5 | 40 | 7.5 | 0.800 | A | D | A |
| Comparative Example 14 | 300 | 50 | 50 | 3 | 39.5 | 7.5 | 0.790 | A | D | A |
| Comparative Example 15 | 150 | 35 | 35 | 0.2 | 34.5 | 0.3 | 0.986 | D | A | C |
| Comparative Example 16 | 150 | 35 | 35 | 0.3 | 27.7 | 7 | 0.791 | B | D | A |
| Comparative Example 17 | 250 | 50 | 50 | 3 | 39.5 | 7.5 | 0.790 | A | D | A |
| Comparative Example 18 | 250 | 50 | 50 | 5.2 | 39.6 | 5.2 | 0.792 | A | D | A |
| Comparative Example 19 (reference) | 150~300 | 25.4~50 | 25~50 | 0 | 25.4~50 (Same value as V) | 0 | 1 | — | — | — |

(Discussion)

As shown in Tables 1 to 3, in the honeycomb structures of Examples 1 to 40 as the examples of the present invention, the movement of the honeycomb segments due to the vibration or the exhaust pressure is effectively suppressed, and there are not any problems of the pressure loss or the PM collecting performance during the usual use as the filter. On the other hand, in the honeycomb structures of Comparative Examples 1, 2, 4 and 15 in which the honeycomb segments of X or Z smaller than 0.3 mm are used, the movement of the honeycomb segments due to the vibration or the exhaust pressure cannot sufficiently be suppressed, and there is the possibility that the problem occurs in the usual use as the filter. Furthermore, in the honeycomb structure of Comparative Example 11 in which the honeycomb segments of X and Z smaller than 0.3 mm are used, the movement of the honeycomb segments due to the vibration or the exhaust pressure cannot sufficiently be suppressed. Additionally, the PM collecting performance is low, and the honeycomb structure is not suitable for the use as the filter. Furthermore, in Comparative Examples 3, 5 to 10, 12 to 14 and 16 to 18 in which Z exceeds 7 mm and/or S1/S2 is smaller than 0.8, the pressure loss is large to such an extent that the influence on the engine performance is not negligible, and the honeycomb structures are not suitable for the use as the filter.

The present invention can suitably be used in a filter or the like to collect particulate materials included in an exhaust gas of a diesel engine or a gasoline engine.

DESCRIPTION OF REFERENCE SYMBOLS

1: honeycomb structure, 2: honeycomb segment, 3: first end surface, 4: second end surface, 5: first pair of parallel side surfaces, 6: second pair of tapered side surfaces, 7: cell, 8: partition wall, 9: bonding material, 10: outer periphery coating layer, 11: row, 12: plugging portion, 13: inlet end surface, and 14: outlet end surface.

What is claimed is:

1. A honeycomb structure in which a plurality of honeycomb segments are integrally bonded via a bonding material, each of the honeycomb segments having a first end surface, a second end surface, porous partition walls to define and form a plurality of cells extending from the first end surface to the second end surface, and an outer peripheral surface connecting the first end surface to the second end surface, wherein as to each of the honeycomb segments other than the honeycomb segments positioned in the outermost periphery of the honeycomb structure among the plurality of honeycomb segments, the first end surface has a quadrangular shape, the second end surface has a quadrangular shape having an area larger than that of the first end surface, the outer peripheral surface comprises four side surfaces, the four side surfaces are constituted of a pair of parallel side surfaces including two side surfaces facing each other in parallel and a pair of tapered side surfaces including two side surfaces facing each other so that a space between the surfaces narrows from the side of the second end surface toward the side of the first end surface, when the first end surface is seen from a vertical direction thereto, both of X and Z are from 0.3 to 7 mm, where X is a distance between a side constituting the shape of the first end surface and coming in contact with the one side surface in the pair of tapered side surfaces and a side constituting the shape of the second end surface and coming in contact with the one side surface in the pair of tapered side surfaces, and Z is a distance between a side constituting the shape of the first end surface and coming in contact with the other side surface in the pair of tapered side surfaces and a side constituting the shape of the second end surface and coming in contact with the other side surface in the pair of tapered side surfaces, S1/S2 is 0.8 or more, where S1 is the area of the first end surface and S2 is the area of the second end surface, the plurality of honeycomb segments are disposed to constitute a plurality of parallel rows extending in a predetermined direction on an end surface of the honeycomb structure, and the honeycomb segments constituting the respective rows have a relation between adjacent honeycomb segments in which the first end surfaces of the respective honeycomb segments are directed opposite to each other, and the tapered side surfaces of adjacent honeycomb segments face each other.

2. The honeycomb structure according to claim 1, wherein the X and the Z have the same value.

3. The honeycomb structure according to claim 2, wherein the honeycomb segments having been aligned with first end surfaces in the same direction as each other and included in adjacent rows are slightly dislocated from each other in an extending direction of the rows.

4. The honeycomb structure according to claim 3, wherein each corner portion of a cross section vertical to a length direction of the honeycomb segment is formed into a round shape having a radius of 0.1 to 5 mm.

5. The honeycomb structure according to claim 2, wherein each corner portion of a cross section vertical to a length direction of the honeycomb segment is formed into a round shape having a radius of 0.1 to 5 mm.

6. The honeycomb structure according to claim 2, wherein each of the honeycomb segments have plugging portions to plug open end portions on the first end surface side of predetermined cells and open end portions on the second end surface side of the remaining cells.

7. The honeycomb structure according to claim 2, wherein the honeycomb structure constructed by bonding a plural number of the honeycomb segments integrally bonded via the bonding material has an outer periphery coating layer formed on a processed surface of the outermost peripheral honeycomb segment by grinding processing.

8. The honeycomb structure according to claim 1, wherein the X and the Z have different values.

9. The honeycomb structure according to claim 8, wherein the honeycomb segments having been aligned with first end surfaces in the same direction as each other and included in adjacent rows are slightly dislocated from each other in an extending direction of the rows.

10. The honeycomb structure according to claim 9, wherein each corner portion of a cross section vertical to a length direction of the honeycomb segment is formed into a round shape having a radius of 0.1 to 5 mm.

11. The honeycomb structure according to claim 8, wherein each corner portion of a cross section vertical to a length direction of the honeycomb segment is formed into a round shape having a radius of 0.1 to 5 mm.

12. The honeycomb structure according to claim 1, wherein the honeycomb segments having been aligned with first end surfaces in the same direction as each other and included in adjacent rows are slightly dislocated from each other in an extending direction of the rows.

13. The honeycomb structure according to claim 12, wherein each corner portion of a cross section vertical to a length direction of the honeycomb segment is formed into a round shape having a radius of 0.1 to 5 mm.

14. The honeycomb structure according to claim 1, wherein each corner portion of a cross section vertical to a length direction of the honeycomb segment is formed into a round shape having a radius of 0.1 to 5 mm.

15. The honeycomb structure according to claim 1, wherein each of the honeycomb segments have plugging portions to plug open end portions on the first end surface side of predetermined cells and open end portions on the second end surface side of the remaining cells.

16. The honeycomb structure according to claim 1, wherein the honeycomb structure constructed by bonding a plural number of the honeycomb segments integrally bonded via the bonding material has an outer periphery coating layer formed on a processed surface of the outermost peripheral honeycomb segment by grinding processing.

* * * * *